(12) United States Patent
Korngold et al.

(10) Patent No.: US 9,963,359 B2
(45) Date of Patent: May 8, 2018

(54) BROMIDE RECOVERY FROM AQUEOUS STREAMS

(71) Applicant: BROMINE COMPOUNDS LTD., Beer Sheva (IL)

(72) Inventors: Emanuel Korngold, Beer-Sheva (IL); Mordechai Cohen, Lehavim (IL); Mira Bergstein Freiberg, Omer (IL); Sharon Krumbein Rubin, Kibbutz Naan (IL)

(73) Assignee: BROMINE COMPOUNDS LTD., Beer Sheva (IL)

( * ) Notice: Subject to any disclaimer, the term of this patent is extended or adjusted under 35 U.S.C. 154(b) by 356 days.

(21) Appl. No.: 14/763,700

(22) PCT Filed: Jan. 27, 2014

(86) PCT No.: PCT/IL2014/000007
§ 371 (c)(1),
(2) Date: Jul. 27, 2015

(87) PCT Pub. No.: WO2014/115133
PCT Pub. Date: Jul. 31, 2014

(65) Prior Publication Data
US 2015/0360974 A1  Dec. 17, 2015

Related U.S. Application Data

(60) Provisional application No. 61/757,161, filed on Jan. 27, 2013.

(51) Int. Cl.
*C02F 1/42* (2006.01)
*B01J 41/05* (2017.01)
(Continued)

(52) U.S. Cl.
CPC .............. *C02F 1/42* (2013.01); *B01J 41/05* (2017.01); *C02F 2001/422* (2013.01);
(Continued)

(58) Field of Classification Search
None
See application file for complete search history.

(56) References Cited

U.S. PATENT DOCUMENTS

| | | | |
|---|---|---|---|
| 3,037,845 A | 6/1962 | Hein | |
| 3,101,250 A * | 8/1963 | Schoenbeck | B01J 41/00 210/683 |

(Continued)

FOREIGN PATENT DOCUMENTS

| | | |
|---|---|---|
| GB | 991610 A | 5/1965 |
| JP | S57129804 A | 12/1982 |

OTHER PUBLICATIONS

Egozy, Belfer & Korngold, "Resins Containingextractants: Preparation and Applications", Reactive Polymers 1, pp. 109-117, (1983).

*Primary Examiner* — Bobby Ramdhanie
*Assistant Examiner* — Denise R Anderson
(74) *Attorney, Agent, or Firm* — Browdy and Neimark, PLLC

(57) ABSTRACT

The invention relates to a process for recovering bromide from a halide-containing aqueous stream, comprising the steps of: providing a feed of halide-containing aqueous stream; contacting an anion-exchange resin with said feed, to form halide-loaded resin; treating said halide-loaded resin with a regenerant and subsequently with a rinse to produce, in succession, a chloride-rich solution, a mixed chloride/bromide solution, a bromide-rich solution and an essentially halide-free solution; directing said mixed chloride/bromide solution to said feed; processing said bromide-rich solution to recover one or more bromide products; and utilizing said essentially halide-free solution for regenerant dilution and/or rinsing of said resin. An apparatus for carrying out the process is also disclosed.

5 Claims, 2 Drawing Sheets

(51) Int. Cl.
    *C02F 101/12*     (2006.01)
    *C02F 103/18*     (2006.01)

(52) U.S. Cl.
    CPC ...... *C02F 2101/12* (2013.01); *C02F 2103/18* (2013.01); *C02F 2303/16* (2013.01); *C02F 2303/185* (2013.01)

(56) References Cited

U.S. PATENT DOCUMENTS

| | | | | |
|---|---|---|---|---|
| 3,316,173 | A | * | 4/1967 | Mills ........................ B01J 41/04 210/683 |
| 3,923,665 | A | * | 12/1975 | Lambert .................... C02F 1/50 210/501 |
| 5,250,187 | A | * | 10/1993 | Franks ...................... B01J 47/10 210/269 |
| 6,379,556 | B1 | * | 4/2002 | Venkat ...................... C02F 1/42 210/670 |
| 2002/0117431 | A1 | * | 8/2002 | Jensen ...................... B01J 47/14 210/134 |
| 2003/0196962 | A1 | | 10/2003 | Fries et al. |
| 2009/0071906 | A1 | * | 3/2009 | Mawle ...................... C02F 1/42 210/677 |

\* cited by examiner

BROMIDE RECOVERY FROM AQUEOUS STREAMS

The invention relates to the recovery of bromide (Br—) from aqueous streams (e.g., aqueous waste streams produced in industrial plants) by means of anion exchange resins.

A bromide-containing aqueous waste stream may be produced, for example, in electric power generating plants which are driven by the combustion of fossil fuels and employ the wet flue gas desufurization (WFGD) process and bromide-containing additives for the removal of sulfur dioxide and mercury, respectively, from the flue gases prior to the release of the flue gases to the atmosphere.

Bromide-containing aqueous waste streams rejected by the industry, and specifically the aforementioned WFGD waste solution, may also contain anions such as chloride and sulfate and cations such as calcium. The separation of bromide from such streams by means of anion-exchange resins is not easily achieved. The chief difficulties reside in that the resin should exhibit sufficiently high bromide selectivity in the presence of chloride and be easily regenerable, bearing in mind that the regenerant used for separating the bromide from the resin should be environmentally friendly and should suppress the potential precipitation of sparingly soluble salts as much as possible (e.g., sulphate salts), such that the precipitation would not occur in the column within which the resin is placed.

An attempt to improve the separation of bromide by the use of bromide-selective resins was made by Egozy, Belfer and Korngold [Reactive Polymers 1, p. 109-117 (1983)] who reported that bromide can be separated from highly concentrated brines in which chloride is also present by means of porous polymers into which Alamine 336—a tertiary amine—was incorporated.

US 2003/0196962 deals with the selective removal of various ions from drinking water. For the purpose of bromide removal, the commercial resin Bromide Plus® was used (available from Purolite Co.).

It has now been found that bromide is recoverable from halide-containing aqueous streams (the term "halide" is used herein to indicate a mixture of bromide and chloride) by means of a class of resins which exhibit the combination of good bromide/chloride selectivity and high capacity, which resins can be effectively eluted and regenerated by the use of suitable regenerants, e.g., sulfuric acid, to produce a bromide-containing solution devoid of chloride. This bromide-containing solution can be used as is or processed to recover useful bromide products (e.g., salts). Reference is now made to FIG. 1 in order to illustrate the invention. FIG. 1 is a graph showing halide concentration versus elution volume curves, which were plotted on the basis of an experiment in which a column packed with a suitable resin (PA 202®; 400 ml) was used for separating bromide from a characteristic halide-containing solution. The resin was subsequently regenerated with an aqueous solution of sulfuric acid (1.5M). The experimental results presented in FIG. 1 clearly demonstrate that the concentration curves of chloride and bromide are separable, and that bromide present in a characteristic WFGD stream is recoverable by the process of the invention. On eluting the resin with sulfuric acid, four major distinct fractions are successively formed. In the first fraction, the predominate halide is chloride, with minor amounts of bromide present; this fraction can therefore be discarded. However, the solution that continually flows down through the column exhibits a sharp decrease in the concentration of the chloride that is washed out (between 1 and 2 BV—the second fraction), while the bromide is gradually separated from the selective resin such that it possible to collect a fraction in which the only halide present is bromide (between about 2 and 5 BV—the third fraction). The halide-containing solution, i.e., the mixed fraction (between 1 and 2 BV) can be returned to and combined with the feed WFGD stream, whereas the consecutively formed bromide-containing fraction is suitable for bromide recovery, namely, for producing bromide salts etc. A further, fourth fraction, which is essentially halide-free, namely, it contains bromide at a very low concentration, can be recycled for the purpose of diluting the regenerant or rinsing the resin, to improve the efficiency of the process.

Accordingly, the invention relates to a process for recovering bromide from a halide-containing aqueous stream, comprising the steps of:
providing a feed of halide-containing aqueous stream; contacting an anion-exchange resin with said feed, to form halide-loaded resin;
treating said halide-loaded resin with a regenerant and subsequently with a rinse to produce, in succession, a chloride-rich solution, a mixed chloride/bromide solution, a bromide-rich solution and an essentially halide-free solution;
directing said mixed chloride/bromide solution to said feed;
processing said bromide-rich solution to recover one or more bromide products; and
utilizing said essentially halide-free solution for regenerant dilution and/or rinsing the resin.

More specifically, the process of the invention comprises feeding the halide-containing aqueous stream into one or more columns where the anion exchange resin is placed, e.g., a fixed-bed column, passing the halide-containing aqueous stream through said resin to form halide-loaded resin, regenerating the halide-loaded resin by the use of a regenerant comprising a solution of sulfuric acid, followed by rinsing, to form, in succession:
a chloride-rich solution (for example, with chloride concentration above 500 ppm and bromide concentration of less than 100 ppm, and even less than 50 ppm);
a mixed chloride/bromide solution (for example, with chloride concentration of 1000-20,000 ppm and bromide concentration of 1000-20,000 ppm);
a bromide-rich solution (for example, with chloride concentration of less than 500 ppm, and even less than 100 ppm, and bromide concentration above 1000 ppm); and
an essentially halide-free solution (for example, with chloride concentration of less than 100 ppm, e.g., less than 30 ppm, and with bromide concentration of less than 200 ppm); discarding said chloride-rich solution;
recycling said mixed chloride/bromide solution, wherein said recycling comprises removing the regenerant from said mixed chloride/bromide solution before it is returned to, and combined with, the feed stream;
processing said bromide-rich solution to recover bromide products (e.g., solid bromide salts, concentrated bromide solutions or bromide-containing acidic solutions); and
recycling said essentially halide-free solution, wherein said recycling comprises diluting a concentrated regenerant solution with said halide-free solution and/or rinsing the resin with said halide-free solution.

The experimental results reported below indicate that it is possible to minimize the volume of the mixed-halide solution, which needs to be returned to the feed, by carefully choosing the anion exchange resins. Resins operable in the invention fulfill simultaneously two requirements with respect to their selectivity and capacity.

An anion exchange resin suitable for use in the invention exhibits high bromide/chloride selectivity, e.g., a selectivity constant of not less than 2.0, e.g., from 2.0 to 10.0, especially not less than 2.50, e.g., from 2.50 to 4.50. More preferred are anion exchange resins with selectivity constant of not less than 2.90, more preferably not less than 3.00. The selectivity constant is a dimensionless quantity defined as follows:

$$K_{Cl}^{Br} = [Br]_{resin}/[Br]_{sol} \cdot [Cl]_{sol}/[Cl]_{resin}$$

An anion exchange resin suitable for use in the invention is characterized by a total capacity of not less than 0.5 meq/g, e.g. from 0.5 to 5 meq/g, especially from 1.2 to 5 meq/g. More preferably, the total capacity of the resin is not less than 3.0 meq/g, and in particular from 3.0 to 5.5 meq/g. The abovementioned total capacities are expressed on a dry weight basis.

Total capacity and selectivity constants are inherent properties of the resin and can be measured by methods known in the art. In the working Examples below, a procedure for measuring selectivity constant and total capacity under static conditions for various resins is illustrated. It should be noted that total capacities and selectivity constants may slightly vary from batch to batch, e.g., within ±5% interval.

The most preferred anion exchange resins have selectivity constant greater than 2.50, e.g., not less than 3.00, for example, in the range from 3.00 to 4.50 (e.g., from 3.00 to 4.10) and total capacity expressed on a dry weight basis greater than 3.00 meq/g, e.g., in the range from 3.0 to 5.0 meq/g. Anion exchange resins satisfying these requirements can be selected from the group of strong base anion resins, for example, resins demonstrating high nitrate selectivity. Exemplary resins are quaternary ammonium salts of the formula $NR_1R_2R_3R_4X$ wherein at least one of $R_1$, $R_2$, $R_3$ is an alkyl group that contains not less than three carbon atoms ($R_4$ indicates the backbone of the polymer to which the resin is attached and X is the anion of the commercial form of the resin, which is typically chloride). Commercially available resins which are especially suitable for use in the invention are Amberlite® PWA 15 from Rohm & Haas Co. and PA 202® (SB) from Pure Resin Co.

The regenerant used for restoring the activity of the ion-exchange resin is preferably sulfuric acid at a concentration of not less than 1 wt %, e.g., from 1 to 20 wt %. The sulfuric acid required for the process may be supplied in a concentrated aqueous form (e.g., an aqueous solution with not less than 50 wt % and up to 98 wt % $H_2SO_4$). Upon dilution of the concentrated sulfuric acid with the essentially halide-free solution generated by the process, a regenerant solution with acceptable $H_2SO_4$ concentration, e.g., from 1 to 2 M, preferably around 1.5 M, is obtained. Alternatively, in some cases the use of hydrochloric acid is possible.

The utilization of a sulfuric acid in the regeneration of the resin results in the formation a mixed chloride/bromide solution which is highly acidic and in which sulfate ions are present. The mixed chloride/bromide solution is treated to increase its pH and remove sulfate therefrom before said mixed chloride/bromide solution is returned to, and combined with, the feed stream. To this end, a base selected from the group consisting of calcium carbonate and calcium hydroxide is added to the mixed chloride/bromide solution, followed by the separation of calcium sulfate which precipitates from said solution.

The rinse used for rinsing the resin is either fresh water, the essentially halide-free solution generated by the process or both.

FIG. 2 is a schematic illustration of an apparatus suitable for carrying out the process of the invention. In its most general form, the apparatus—which forms another aspect of the invention—comprises:

at least one ion exchange column (IEX), at least one feed line (4) connected to the top of said column and at least one discharge line (7) connected to the bottom of said column; wherein said feed line (4) is connected, upstream to said column, to a first (1), second (2) and third (3) storage tanks, via conduits (1a), (2a) and (3a), respectively, and also to a raw water supply (11) via conduit (11c), wherein a feed solution to be treated is held in tank (1), a regenerant solution is held in tank (2), and a rinse liquid is held in a rinse tank (3);

wherein the discharge line (7) is connected to a drainage (8) and a product recovery unit (10);

characterized in that said apparatus comprises a first flow path (9), a second flow path (12) and a third flow path (13) connecting said discharge line (7) to the inlets of said first (1), second (2) and third (3) storage tanks, respectively, thereby providing three flow loops for recycling solutions withdrawn from said ion exchange column during operation.

Preferably, feed line (4) splits into two branches (4, 5) which are connected to the top and bottom of the column, respectively, for reversing the direction of flow through the column, i.e., allowing co-current or countercurrent regeneration and rinse. To this end, the apparatus is further provided with a secondary discharge line (6) exiting from the top of the column IEX. As shown in FIG. 2, the main discharge line (7) and the secondary discharge line (6) can be united.

The solution to be treated is produced in an industrial plant (not shown) and may be transferred to storage tank (1) via supply pipe (14). The regenerant is supplied to tank (2) through supply pipe (15) from fresh regenerant reservoir (not shown), for example, a storage tank where a concentrated form of the regenerant is held, such as 98 wt % concentrated aqueous sulfuric acid.

Flow path (9) is provided with a base dosing device (17) for injecting an alkaline agent into said flow path (9), with solid/liquid separation device, e.g., a filter (16), being disposed downstream of said base dosing device (17), for removing solids that precipitate in a fluid which passes through said flow path (9). Base dosing device (17) serves the purpose of increasing the pH of a typically acidic solution flowing through path flow (9) on recycling to the storage tank (1). When the regenerant utilized is sulfuric acid, an addition of a base such calcium carbonate or calcium hydroxide may result in the precipitation of calcium sulfate which is removed from the recycled solution before it is returned to storage tank (1) to be combined with the feed.

The operation of the apparatus shall now be described in detail connection with the process of recovering bromide from halide-containing aqueous feed stream. It should be noted, however, that the apparatus may be operated to serve other useful purposes, e.g., treatment of solutions which may benefit from the utilization of recycling loops in connection with ion exchange-based processes.

As noted above, the column loaded with the ion exchange resin is indicated by the letters IEX. The apparatus further comprises three tanks for holding the feed (i.e., the halide-containing aqueous feed stream, e.g., WFGD waste stream), the regenerant (e.g., a solution of sulfuric acid at a concentration of 1.5M) and the rinse (water recycled during the process), and an array of valves. A valve is indicated by XVj, where j is an integer from 1 to 13. The feed, regenerant and rinse are indicated by numerals 1, 2 and 3, respectively.

The process comprises a loading step, a regeneration step and a rinsing step. During the loading step, valves XV1, XV4, XV7 and XV8 are open, allowing the halide-containing aqueous feed stream to flow to, and pass through, the column packed with the ion exchange resin. During the passage of the feed stream through the column, chloride and bromide are removed from said stream and adsorbed onto the resin, thereby forming a chloride/bromide-loaded resin. At this stage, a first solution is formed in the column, which is characterized by low bromide content (e.g., less than 100 ppm bromide). This solution can therefore be discharged from the column and discarded via drainage port (8). Typically, the volume of the first solution, which, as previously explained, is generated by the process during the loading step, is between 0 and 5 BV.

The next step is a regeneration step, which in turn can be divided into three distinct stages: an initial stage, in which the solution generated by the process in the column is essentially bromide-free and chloride-rich, and can therefore be discarded (hereinafter "the second solution"; the first and second solutions correspond together to the chloride-rich solution mentioned above); an intermediary stage, in which the solution generated by the process is acidic and contains high concentration of both chloride and bromide, and is returned to the feed after removal of excess regenerant by means of addition of calcium carbonate or calcium hydroxide (hereinafter "the third solution"; the third solution corresponds to the mixed chloride/bromide recyclable solution mentioned above); and a final stage, in which the solution generated by the process is characterized by high and low content of bromide and chloride, respectively (hereinafter "the fourth solution"), which solution can be processed, e.g., to recover bromide salts therefrom, which in turn can be recycled and used for any desired purpose, e.g., in the industrial plant implementing the process of the invention or elsewhere. The fourth solution corresponds to the bromide-rich solution mentioned above.

The regeneration step will now be described in more detail with reference to FIG. 2. The regeneration begins by washing the column with a raw water stream for a short period of time and then switching to an acidic stream supplied from the $H_2SO_4$ tank 2. At the initial stage of the regeneration step, the second solution is continually formed in the column, with low bromide content. This solution can therefore be discarded. Thus, during the initial stage of the regeneration step, valves XV11, XV4, XV7 and XV8 are open, feeding raw water to the column and allowing the discharge of said second solution to the drain, and then valves XV2, XV4, XV7 and XV8 are open, feeding sulfuric acid to the column and allowing the discharge of said second solution to the drain (8). Typically, the volume of the second solution, which, as previously explained, is generated by the process during the initial stage of the regeneration step, is between 0.2 and 1.0 BV (depending on the bromide concentration which can be discarded).

Subsequently, the third solution is continually formed in the column. The third solution is acidic and is characterized by both high chloride and bromide levels; it is discharged from the column and is returned to, and combined with, the feed stream through flow path (9), by means of maintaining valves XV2, XV4, XV7 and XV9 open. The volume of the third solution, which is generated by the process during the intermediary stage of the regeneration step, is not less than 0.1 BV, e.g., between 0.1 and 4 BV, more specifically between 0.1 and 3 BV. Line (9) which is used to deliver the third solution back to the feed stream (1) is preferably provided with neutralization means (17), e.g., for injecting a calcium base (calcium carbonate or calcium hydroxide) into the returned stream consisting of the third solution, and filtration means (16), for separating sparingly soluble sulphate salts which may precipitate in said solution.

In the final stage of the regeneration step a fourth solution is formed in the column. The fourth solution is acidic and contains high bromide concentration (e.g., between 0.2 and 5%, e.g. between 1 and 3%) and low chloride concentration. The fourth solution can therefore be processed in unit (10) for collecting bromide salts therefrom. Accordingly, at the final stage of the regenerating step, valves XV2, XV4, XV7 and XV10 are open. The fourth solution is directed to a suitable reactor (10) where it is subjected to neutralization by means of the addition of a base, followed by the removal of sparingly soluble sulphate salts by means of filtration and then water evaporation whereby bromide salts/solutions (depending on the degree of evaporation) are collected in a solid/solution form suitable for use as additives and chemical reagents. It is also possible to recover an acid bromide-containing solution. For example, when the process of the invention is carried out in an electric power generating plant, then a solution of bromide salts can be recovered and added to the coal or to the furnace, serving the useful purpose of controlling mercury emission from the flue gases formed. The volume of the bromide-rich solution may be from 1.5 to 3.5 BV.

The regeneration step is followed by a rinsing step, for removing residual amounts of the sulfuric acid from the resin. To this end, either a pure water stream may be used, or a suitable aqueous solution produced and recycled by the process. It should be noted that at the very beginning of the rinsing step, the aqueous solution flowing down through the column may still contain relatively high bromide concentration, such that it can be directed to the reactor (10) used for recovering the bromide salts (valves XV3, XV4, XV7 and XV10 are open). The volume of this solution may be 1 to 2 BV. While the rinsing is in progress and the rinse flows through the column, a fifth solution is generated by the process, which contains bromide in an amount which is too low for product recovery and too high for discarding. The fifth solution can be directed to the sulfuric acid-containing tank via flow path (12), namely, valves XV3, XV4, XV7 and XV12 are open, for diluting the regenerant. The volume of the fifth solution is typically from 2 to 4 BV. From this point, a raw water stream (11) is used for rinsing the resin. As the washing proceeds, a sixth solution flows down through the column, which solution is sufficiently dilute for the purpose of recycling, and is therefore allowed to flow into the rinse tank via flow path (13), namely, valves XV11, XV4, XV7 and XV13 are open. The volume of the sixth solution is typically from 3 to 6 BV. The fifth and sixth solutions together correspond to the essentially halide-free solution mentioned above. The seventh solution generated by the process can be discarded (valves XV11, XV4, XV7 and XV8 are open).

In the process described above, it is advantageous to periodically reverse the direction of flow through the column, in order to minimize bromide leakage from the resin. Thus, if the pair of valves XV4 and XV7 is maintained open in a given production cycle, as demonstrated above in reference to FIG. 2, in the next production cycle these two valves will be closed and the pair of valves XV5 and XV6 will be open instead.

Columns suitable for use in an industrial process may have, for example, a volume of 2 to 4 cubic meters. In general, the volume of the resin loaded in such a column constitute at least 70%, for example between 70-90% of the column volume.

It should be noted that the process of the invention is not only useful for purifying wastewater from bromides, in order to allow the purified streams to be discarded, but also for recovering the bromide originally in the wastewater in the form of solid bromide salts, bromide salts solutions or bromide-containing acidic solutions. In general, halide-containing aqueous waste streams which may be subjected to the extraction process according to the invention have bromide:chloride ratio of at least 1:25, e.g., not less 1:10 or not less than 1:5, more specifically from to 1:4-2:1. Such waste streams include—but are not limited to—WFGD solutions, namely, the solutions produced in electric power generating plants employing the WFGD process, in which the flue gas flows through a suitable gas-liquid contactor and contacts therein with calcium-containing slurry (e.g., limestone). Sulfur dioxide present in the flue gas is absorbed in the slurry and transforms into sulfur trioxide which in turn reacts with the calcium compound in a suitable reaction vessel. The following is an exemplary composition of the waste aqueous solution generated by a typical WFGD process: 0.1-1 wt % $Ca^{2+}$, 0.05-1.4 wt % $Mg^{2+}$, 0.1-1.5 wt % $Na^+$, 0.05-3 wt % $Br^-$, 0.2-3 wt % $Cl^-$, 0.1-0.4 wt % $SO_4^{2-}$ and 0.005-0.2 wt % $NO_3^-$, with specific gravity of about 1.04 g/cm$^3$.

EXAMPLES

Materials

Figure 1:
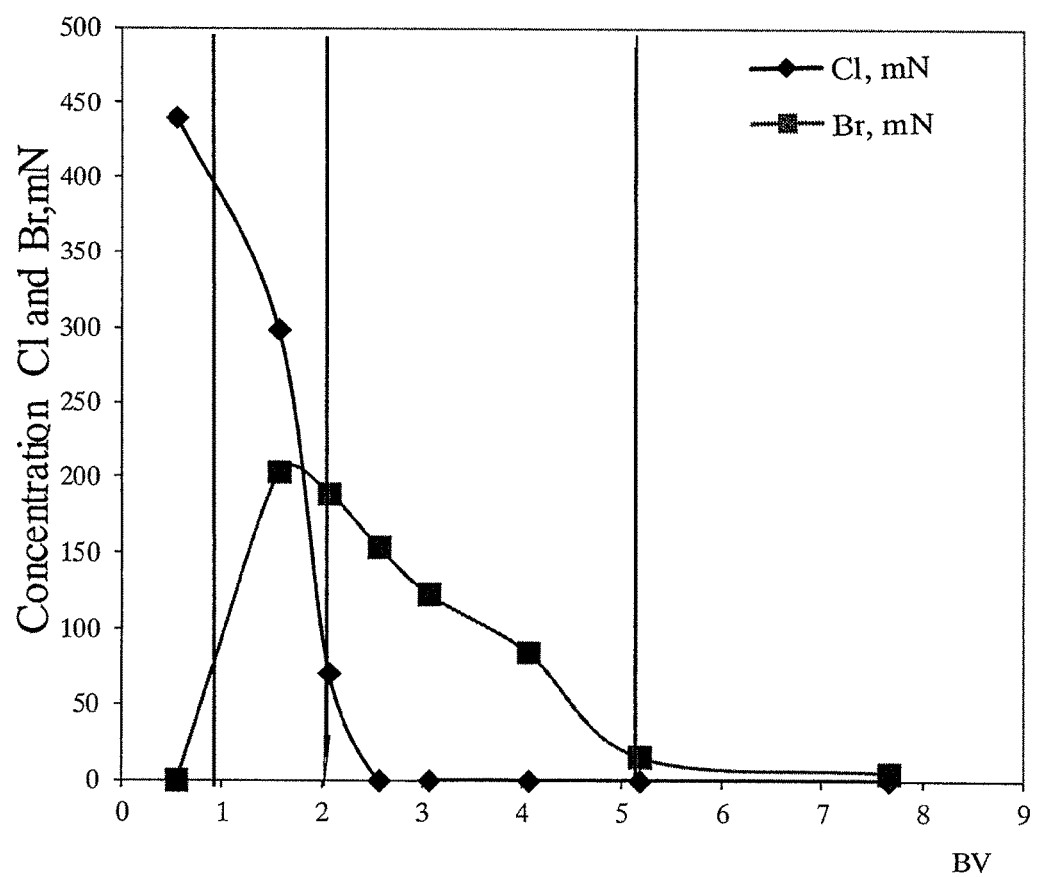
FIG. 1 is a graph showing halide concentration curve versus elution volume obtained by the invention.
Figure 2:
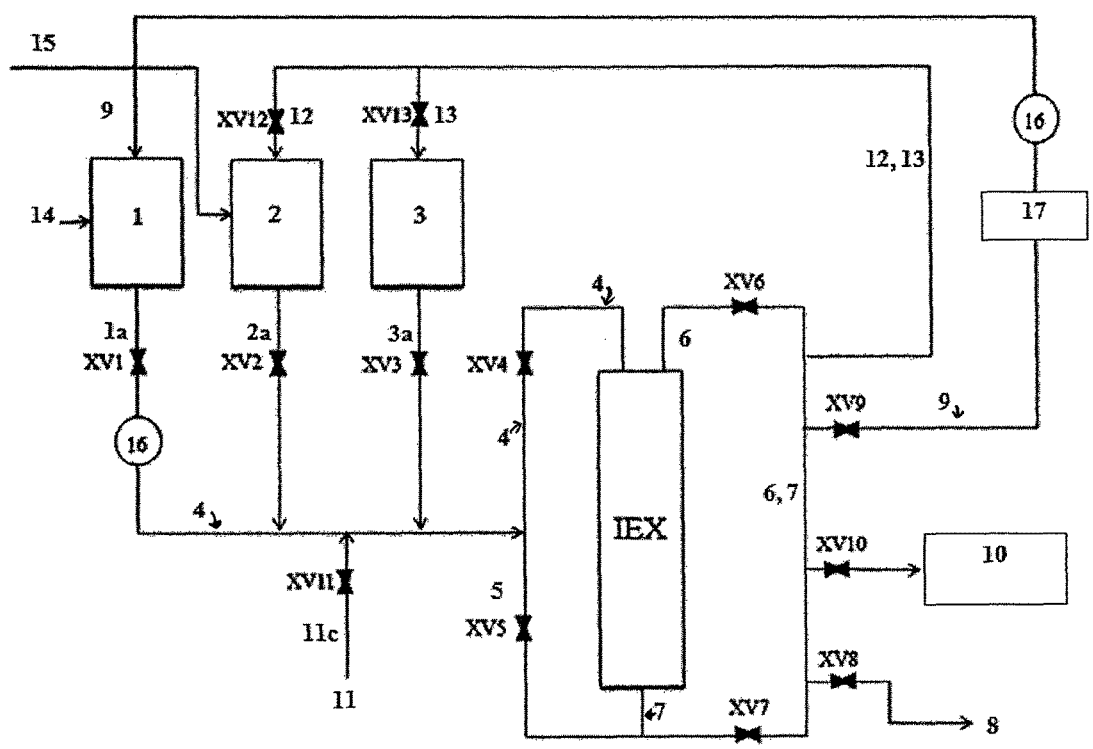
FIG. 2 is a schematic illustration of an apparatus suitable for carrying out the process of the invention.

Details regarding the resins tested in the following examples are tabulated below:

TABLE A

| Ion-exchange resin [PRODUCER] | GENERAL DESCRIPTION |
|---|---|
| Resin A: Amberlite PWA 15 [Rohm & Haas Co.] | Strong base anion exchange resin |
| Resin B: PA 202 (SB) [Pure Resin Co.] | Strong base anion exchange resin |
| Resin C: Levatit Mono Plus SR-7 [Lanxess] | Strong base anion exchange resin |
| Resin D: Amberlite PWA 5(SB) [Rohm & Haas Co.] | Strong base anion exchange resin |
| Resin E: Relite A-490 (SB) [Mistubishi] | Strong base anion exchange resin |
| Resin F: Bromide Plus (SB) [Purolite Co.] | Strong base anion exchange resin |

Examples 1 to 6

Testing the Properties of Various Resins

The selectivity and capacity of various commercially available anion exchange resins towards the separation of chloride and bromide from aqueous solution was investigated under "static" conditions. 10 g of the tested resin (in the form of its chloride salt) were added to a chemical flask and were mixed for two hours with 50 ml sample of an aqueous solution having the following composition: chloride—363.59 mN, bromide—164.74 mN and sulfate—63.54 mN. The resin was separated from the solution by filtration.

The filtrate was tested to determine the concentrations of the aforementioned anions. These concentrations are designated in Table 1 below as $X_{sol}$, wherein X indicates the anion. The resin was washed with deionized water and was then mixed with an aqueous solution of potassium nitrate (1N, 100 ml) for two hours, in order to allow the regeneration of the resin. The concentration of chloride and bromide adsorbed by the resin were then determined. These concentrations are designated in Table 1 below as $X_R$, wherein X indicates the anion.

The selectivity constants are calculated by multiplying the ratio between the concentration of the bromide in the resin and its concentration in the solution ($Br_R$:$Br_{sol}$) with the ratio between the concentration of the chloride in the solution and its concentration in the resin ($Cl_{sol}$:$Cl_R$), namely, $K_{Cl}^{Br}=[Br]_{resin}/[Br]_{sol}\cdot[Cl]_{sol}/[Cl]_{resin}$. The total capacity is calculated by dividing the amount of chloride and bromide adsorbed by the resin, by the weight of the dry resin or the volume of the wet resin (sulfate capture by the resin is negligible). The details regarding the resins under study, the concentrations of the anions measured both in the solution and in the resin, the calculated selectivity constants ($K_{sel}$) and resin capacities are tabulated in Table 1.

TABLE 1

| | | | | | | | | | Capacity | |
|---|---|---|---|---|---|---|---|---|---|---|
| Ex. | Resin | $Cl_{sol}$ | $Cl_R$ | $Br_{sol}$ | $Br_R$ | $SO4_{sol}$ | $SO4_R$ | $K_{sel}$ | meq/ml | meq/g |
| 1 | A | 479.4 | 1.57 | 54.57 | 0.55 | | | 3.07 | 2.12 | 4.95 |
| 2* | B | 497.0 | 1.23 | 53.11 | 0.53 | 60.66 | 0.03 | 4.00 | 1.76 | 3.35 |
| 3 | C | 406.1 | 0.51 | 85.31 | 0.47 | 45.20 | 0.01 | 4.39 | 0.98 | 1.55 |
| 4 | D | 244.0 | 1.01 | 30.00 | 0.51 | | | 4.09 | 1.53 | 2.79 |
| 5 | E | 465.2 | 1.55 | 58.90 | 0.45 | | | 2.85 | 2.11 | 5.14 |
| 6 | F | 433.2 | 0.97 | 57.60 | 0.54 | | | 4.13 | 1.51 | 2.78 |

*ion chromatography analysis

Examples 7 to 10

Testing the Properties of Various Regenerants

The previous set of examples demonstrates that nitrate can be used as a regenerant for separating bromide from the resins under study. However, the presence of nitrate in wastewater is unacceptable due to environmental concerns. In the following set of experiments, the efficacy of different solutions as potential regenerants in the process of the invention was investigated.

10 g of Resin D (Amberlite PWA5 in the form of its chloride salt) were added to a chemical flask and were mixed for two hours with 50 ml sample of an aqueous solution having the following composition: chloride—about 370 mN, bromide—about 160 mN and sulfate—about 60 mN. The resin was then separated from the solution by filtration, to form a first filtrate. The first filtrate was tested for the concentrations of the aforementioned halides. The resin was then subjected to washing, separated from the solution by filtration, whereby a second filtrate was formed. The second filtrate was tested for the concentrations of the aforementioned halides. The concentrations of the halides adsorbed onto the resin were then calculated by subtracting their concentrations in the two filtrates from their initial concentration.

The resin was then mixed with the regenerant under study (four different potential regenerants were tested: an aqueous solution of sulphuric acid, an aqueous solution of sodium sulphate, an aqueous solution of sodium bicarbonate and an aqueous solution of sodium bisulphite). The regenerant was added portionwise to the resin (the volume of each added portion was 25 ml). After each addition, the concentrations of the halides removed from the resin were measured. The results are tabulated in Table 2.

TABLE 2

| Ex. | Regenerate | Volume (ml) | Cl meq/l | Cl meq | Br meq/l | Br meq |
|---|---|---|---|---|---|---|
|  | in | 50 | 386.6 | 18.43 | 158.4 | 7.92 |
| 7 | 1 | 50 | 435.32 | 21.76 | 57.6 | 2.88 |
|  | washing | 48 | 37.73 | 1.8 | 5.054 | 0.24 |
|  | in |  |  |  |  | 4.8 |
|  | $H_2SO_4$ (1.3M) | 25 | 204.70 | 5.12 | 55.25 | 1.38 |
|  |  | 25 | 107.07 | 2.68 | 39.18 | 0.98 |
|  |  | 25 | 49.45 | 1.24 | 30.33 | 0.76 |
|  |  | 25 | 20.67 | 0.52 | 23.70 | 0.59 |
|  |  | 25 | 9.47 | 0.23 | 16.25 | 0.39 |
|  | out |  |  |  |  | 4.1 |

TABLE 2-continued

| Ex. | Regenerate | Volume (ml) | Cl meq/l | Cl meq | Br meq/l | Br meq |
|---|---|---|---|---|---|---|
| 8 | 1 | 50 | 436.0 | 21.80 | 58.5 | 2.92 |
|  | washing | 49 | 36.6 | 1.79 | 4.9 | 0.24 |
|  | in |  |  |  |  | 4.76 |
|  | $Na_2SO_4$ (1M) | 25 | 170.96 | 4.27 | 20.14 | 0.50 |
|  |  | 25 | 88.94 | 2.22 | 13.63 | 0.34 |
|  |  | 25 | 52.16 | 1.30 | 9.95 | 0.25 |
|  |  | 25 | 37.58 | 0.86 | 7.34 | 0.17 |
|  | out |  |  |  |  | 1.26 |
| 9 | 1 | 50 | 430.0 | 21.50 | 54.3 | 2.71 |
|  | Washing | 25 | 64.2 | 1.60 | 8.9 | 0.21 |
|  | in |  |  |  |  | 5.00 |
|  | $NaHCO_3$ (1N) | 25 | 304.23 | 7.60 | 58.60 | 1.46 |
|  |  | 25 | 83.71 | 2.09 | 22.33 | 0.56 |
|  |  | 25 | 52.85 | 1.32 | 20.33 | 0.51 |
|  |  | 25 | 27.86 | 0.70 | 10.85 | 0.27 |
|  | out |  |  |  |  | 2.80 |
| 10 | 1 | 50 | 431.30 | 21.57 | 62.12 | 3.10 |
|  | in |  |  |  |  | 4.82 |
|  | 10% $NaHSO_3$ | 25 | 165.69 | 4.14 | 31.26 | 0.78 |
|  |  | 25 | 114.68 | 2.87 | 26.22 | 0.66 |
|  |  | 25 | 63.24 | 1.58 | 21.30 | 0.53 |
|  |  | 25 | 33.38 | 0.67 | 15.15 | 0.30 |
|  | out |  |  |  |  | 2.27 |

The results tabulated above show that sulphuric acid is especially suitable as a regenerant in the process of the invention, due to the fact that it is capable of separating most of the bromide adsorbed by the resin.

Examples 11 to 14

Separating Bromide from Halide Solutions in a Resin

Resins A, B, C and F were tested for their ability to separate bromides from chlorides in solutions which are passed through a column loaded with the resin under study, followed by eluting the resin with sulphuric acid at concentration of 1.5M. The resin under study was placed in a column with internal diameter of 16 mm and height of 93 cm. The volume of the resin used was 210 ml. During the loading step (the passage of the halide-containing stream through the column) and the subsequent regeneration step (consisting of water addition to the column, followed by sulfuric acid) the solution which flows down through the column was periodically sampled and analyzed for $H^+$, $Cl^-$ and $Br^-$ concentrations. The relevant details and some calculated properties are tabulated in Table 3.

TABLE 3

| Ex. | resin | Sample Volume (ml) | Solution concentration Br (mN) | Solution concentration Cl (mN) | Br/Cl wt ratio | Active capacity Br meq/l | Recyclable Solution Cl + Br (BV) | Product Solution Br only (BV) |
|---|---|---|---|---|---|---|---|---|
| 11 i | A | 500 | 140.2 | 26.2 | 12.1 | 333.9 | 0.95 | 2.38 |
| 11 ii | A | 600 | 152.8 | 56.7 | 6.1 | 436.7 | 0.48 | 2.86 |
| 12 i | B | 500 | 193.1 | 98.1 | 4.4 | 459.5 | 0.48 | 2.38 |
| 12 ii | B | 600 | 129.9 | 30.0 | 9.7 | 371.0 | 0.95 | 2.86 |
| 13 i | C | 500 | 121.9 | 41.8 | 6.5 | 288.0 | 2.40 | 2.38 |
| 13 ii | C | 600 | 84.8 | 10.2 | 18.7 | 242.0 | 2.88 | 2.86 |
| 14 i | F | 480 | 116.3 | 28.3 | 9.2 | 265.7 | 1.90 | 2.29 |
| 14 ii | F | 600 | 106.2 | 21.0 | 11.4 | 303.0 | 2.57 | 2.86 |

The results tabulated in Table 3 demonstrate that the use of Resins A or B in the process of the inventions allows good separation of bromide from halide-containing aqueous streams, as indicated by the relatively small volume (less than 1 BV) of the mixed chloride/bromide solution, which needs to be recycled. Furthermore, Resin A and B exhibit high active capacity of bromide and processes employing these resins are capable of producing relatively high concentration of bromide solutions, which could be effectively processed to recover bromide salts therefrom. The use of Resins C and F is less preferred, due to the fact that these resins generate the mixed halide containing-solution and the product (bromide) solution at approximately equal volumes, of about 2 BV.

The invention claimed is:

1. A process for recovering bromide from a halide-containing aqueous stream, comprising the steps of:
    providing a feed of halide-containing aqueous stream;
    contacting an anion-exchange resin with said feed, to form halide-loaded resin;
    treating said halide-loaded resin with a regenerant and subsequently with a rinse to produce, in succession, a chloride-rich solution, a mixed chloride/bromide solution, a bromide-rich solution and an essentially halide-free solution; directing said mixed chloride/bromide solution to said feed; processing said bromide-rich solution to recover one or more bromide products; and
    utilizing said essentially halide-free solution for regenerant dilution and/or rinsing of said resin.

2. A process according to claim 1, wherein the anion-exchange resin is a strong base anion exchange resin with a total capacity of not less than 3.00 meq/gram expressed on a dry weight basis and a selectivity constant bromide-chloride of not less than 2.5.

3. A process according to claim 1, wherein the regenerant comprises a solution of sulfuric acid.

4. A process according to claim 3, wherein the mixed chloride/bromide solution is treated to increase its pH and remove sulfate therefrom before said mixed chloride/bromide solution is returned to, and combined with, the feed stream.

5. A process according to claim 4, wherein a base selected from the group consisting of calcium carbonate and calcium hydroxide is added to the mixed chloride/bromide solution, followed by the separation of calcium sulfate precipitate from said solution.

* * * * *